Sept. 12, 1950 G. R. CLARK 2,521,690
SECRECY PRESERVING SIGNALING SYSTEM
Filed Aug. 14, 1945
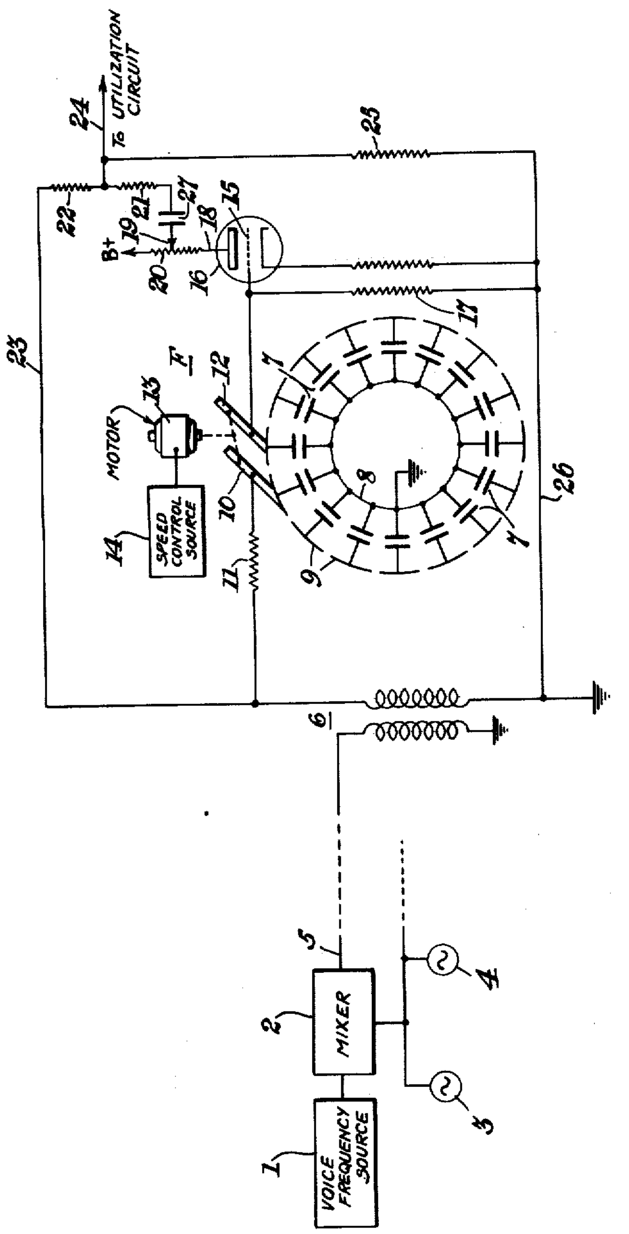
INVENTOR.
GILBERT R. CLARK
BY Percy P. Lantzy
ATTORNEY Patented Sept. 12, 1950 2,521,690

UNITED STATES PATENT OFFICE 2,521,690

SECRECY PRESERVING SIGNALING SYSTEM

Gilbert R. Clark, Fort Wadsworth, N. Y., assignor to Federal Telephone and Radio Corporation, New York, N. Y., a corporation of Delaware Application August 14, 1945, Serial No. 610,859

7 Claims. (Cl. 179—1.5)

This invention relates to wave signaling systems and more especially to methods and means for preserving secrecy of transmission and reception in such systems.

A principal object of the invention is to provide an improved voice frequency secrecy transmission and receiving system.

Another object of the invention is to provide a secrecy arrangement which is particularly well suited to voice transmission and which may be also employed in telegraph systems having a rotary element at the receiver. Typical of such systems are so called facsimile systems employing a rotatable scanner.

A feature of the invention relates to an arrangement for secret transmission of voice frequency intelligence, by injecting into the transmitted signals one or more waves having a predetermined harmonic content for masking the intelligence waves, and separating out at the receiving end the masking waves through the intermediary of a special filter of the harmonic characteristic type.

Another feature relates to the novel organization, arrangement and relative correlation of parts which cooperate to produce an improved secrecy transmission system with a high degree of secrecy flexibility.

Other features and advantages not particularly described will be apparent after a consideration of the following description and the appended claims.

Inasmuch as the invention is concerned primarily with the secrecy aspects of audible signalling systems, the invention is not limited to any particular kind of voice frequency transmitter or receiver. Therefore, while reference will be made herein to a secrecy voice transmission arrangement, it will be understood that this is done merely for explanatory purposes and not by way of limitation on the inventive concept.

Accordingly in the drawing, there is given a block diagrammatic illustration of a signaling system embodying the invention. In the drawing, the numeral 1 represents schematically any well-known source of voice frequency signaling waves. For example, source 1 may represent any suitable audio signal transmitter. The voice frequency signals from source 1 are applied to a mixer device or network 2. Also applied to network 2 is one or more signals from sources 3 and 4. In accordance with the invention, each of the sources 3 and 4 is arranged to produce a wave which is a harmonic of any desired frequency within the voice frequency band from source 1.

For example, if the signals from source 1 are in the band from 300 to 3000 C. P. S., the source 3 may generate a frequency of 700 C. P. S., and the source 4 may generate a frequency of 1400 C. P. S., etc. It will be understood of course, that it is not necessary to employ separate sources for generating these or other harmonic masking frequencies. A single source may be employed containing two or more of the masking frequencies as is well-known in the harmonic producing art. Thus, there is applied to line 5 a mixture of the voice frequency intelligence signals from source 1 and the masking frequencies from sources 3 and 4. If desired, the level of the masking frequencies may be much higher than the level of the voice frequency intelligence signals.

These mixed signals and harmonic frequencies can then be transmitted over any suitable communication channel such as a wire line 5, or over a radio channel. Merely for illustration, the drawing shows the channel 5 as of the wire type. At the receiving end of channel 5, the mixed intelligence and masking frequencies are applied to a suitable coupling device 6 and thence to a network which includes a special harmonic filter F, which has the property of filtering out with a high degree of selectivity those frequencies corresponding to the masking frequencies from sources 3 and 4. This I find can be accomplished by means of a synchronous or harmonic filter comprising a bank of condensers 7 which have their corresponding plates or terminals multiplied to a common return conductor 8. The remaining corresponding plates or terminals of the condensers are connected to individual spaced and stationary distributor segments 9, arranged in circular array in the nature of a commutator. Associated with these contact segments so as to contact them successively, is a brush 10 which is connected through a resistor 11 to one terminal of the input device 6. Also associated with the commutator segments is another brush 12 which is arranged to be rotated around the segments in contact therewith either at the same speed as brush 10 or at a multiple rate of speed with respect to brush 10. For this purpose, the brushes 10 and 12 may be connected to a common shaft which is driven at the required rate by motor 13. Preferably, motor 13 is speed-controlled by any well-known device or source 14, so as to maintain its speed highly constant. Instead of driving the brushes 10 and 12, the brushes may be made stationary and the condenser unit rotated.

The brush 12 is connected to grid 15 of an amplifier tube 16 of relatively high input impedance, such as may be provided by a relatively high resistor 17, whereby a plate current is produced in circuit 18 which is 180° out of phase with respect to the grid voltage obtained by the brush 12 contacting the commutator segments 9. The inverted output energy of the filter is adjusted in amplitude by contact 19 which is movable along resistor 20. Contact 19 is connected through blocking condenser 27 to one terminal of the series resistors 21, 22, the opposite side thereof being connected by line 23 to the input side of resistor 11. The common connection of resistors 21, 22 may be connected by line 24 to any suitable utilization circuit, the same connection being connected through a resistor 25 which is relatively low with respect to resistors 21 and 22, to ground conductor 26. The resistor 17 connecting the grid circuit of tube 16 to ground conductor 26 is also relatively high thus providing a high impedance to the output of brush 12. The brush 12 thus "reads" the voltage charge in the condensers and controls the operation of tube 16 accordingly without materially altering the condenser potentials.

The motor 13 drives the brushes 10 and 12 at a speed which is an integral sub-multiple of the masking frequencies. Thus, assuming the lower masking frequency is 700 C. P. S., then brushes 10 and 12 may be revolved at the rate of 100 R. P. S., for example. With such an arrangement, any applied masking frequency, e. g. 700 C. P. S., 1400 C. P. S., etc., which is a multiple of the brush speed in revolutions per second applies the same polarity and magnitude of potential to each of the condensers 7 during each revolution. All other non-harmonic frequencies will tend both to charge and discharge the condensers from time to time but their action will not be cumulative as will be the case with the masking frequencies. The charging rate for the condenser 7 under control of the input transformer 6 will be determined mainly by the resistance 11. The frequencies corresponding to the masking frequencies above noted, will build up charges in the condensers while other frequencies will not so build up. With this arrangement therefore, the filter F presents a highly selective characteristic with an extremely high Q with respect to the masking frequencies.

The energy stored in the condenser 7 is applied by the brush 12 to the control grid 15 of tube 16. In accordance with the invention, the waves applied over output circuit 18, 20, 19, 27 and 21 to output line 24 are in phase opposition to the waves corresponding to the masking frequencies applied with the signal energy over a connection 23. Thus, the harmonic or masking frequencies will cancel each other out, so that there remains in the output connection 24 only the voice frequency signals originally transmitted from source 1. For a detailed description of the filter F and other modifications thereof that may be employed in connection with the present invention, reference may be had to my copending application Serial No. 591,894, filed May 4, 1945, now abandoned.

The motor 13 which drives the brushes 10 and 12 may be controlled or locked by any suitable synchronizing means in synchronism with the means which generates the masking frequencies at the sources 3 and 4. With this arrangement therefore, the masking frequencies may be changed from time to time at the transmitter and the rejection or harmonic filter F will be properly synchronized so as to cancel out the masking frequencies at the receiver.

While I have shown and described a particular embodiment of the invention it is recognized that many changes and modifications thereof are possible without departing from the invention, and therefore the present embodiment is to be regarded as illustrative of the invention only and not as restricting the scope thereof.

I claim:

1. A receiving arrangement for receiving voice-frequency intelligence signals which are masked by at least one masking frequency in the voice-frequency range, said arrangement including a bank of energy storing devices, a distributor having a bank of contacts connected individually to corresponding terminals of said storage devices, a common return circuit multipled to the other corresponding terminals of said devices, a pair of brushes for successively and recurrently contacting said segments at a rate which is locked to said masking frequency, means to apply received signal energy to one of said brushes, a phase inverter, means to connect the other of said brushes to said phase inverter, and means to apply the output of said inverter to the received signal energy to delete therefrom the frequency corresponding to said masking frequency.

2. A receiving arrangement according to claim 1 in which said brushes are connected to a driving motor to drive them at a rotational speed which is an integral sub-multiple of said masking frequency.

3. In a receiving arrangement having means for receiving voice-frequency signal energy which is mixed with masking energy of frequencies in the voice-frequency range, a harmonic filter having a bank of condensers, means to apply the received signal and masking frequency energy to said condensers successively and recurrently at a predetermined rate which is a sub-multiple of the masking frequencies, output means to commutate said condensers at said rate, a utilization circuit, and means connecting said output means to said utilization circuit so that substantially only said masking frequencies are deleted therefrom.

4. A receiving arrangement according to claim 3 in which said masking frequencies are harmonics of a given frequency and said means for connecting said filter to said utilization circuit include a phase inverter whereby the output of said filter is applied in phase opposition to the received signals.

5. In a receiver arrangement for receiving signal frequency waves which are masked by at least one masking frequency wave in the frequency range of said signal waves; a bank of energy storing devices, means to apply received signal energy to said energy storing devices in cyclical recurrent successions at a rate which is correlated with the frequency of the masking waves so as to be an integral sub-multiple thereof, means to obtain in cyclical recurrent successions at said rate a voltage output from said storage devices, and means to apply said voltage output in opposition to the received waves to delete therefrom the masking frequency waves.

6. In a secrecy signaling system, for use with a voice frequency utilization circuit, a source of voice frequency waves, means to add to said waves a plurality of masking frequencies in the voice frequency range, means to receive the mixed signals, a harmonic selector comprising a bank of energy storing devices and means to charge and discharge said devices in cyclical recurrent succession at a rate which is an integral sub-multiple of the frequency of the masking signals, said harmonic selector being located between the receiving means and said utilization circuit and serving to delete said masking frequencies.

7. In a secrecy signaling system, for use with a voice frequency utilization circuit, a source of voice frequency waves, means to mix with said waves a plurality of masking frequencies in the voice frequency range, means to receive the mixed signals, a harmonic selector comprising a bank of condensers, distributor means to apply said mixed signals to said condensers by increments at a rate correlated with the frequency of said masking frequencies, and means to obtain voltage increments from said condensers at a rate also correlated with the frequency of said masking frequencies, said harmonic selector being operatively located between said receiving means and said utilization circuit and serving to delete the said masking frequencies.

GILBERT R. CLARK.

REFERENCES CITED

The following references are of record in the file of this patent:

UNITED STATES PATENTS

| Number | Name | Date |
|---|---|---|
| 1,571,010 | Kendall | Jan. 26, 1926 |
| 1,753,353 | Steinberg | Apr. 8, 1930 |
| 2,083,653 | Kasemann | June 15, 1937 |
| 2,402,059 | Craib | June 11, 1946 |
| 2,406,841 | Levy | Sept. 3, 1946 |